United States Patent
Patil et al.

(10) Patent No.: US 9,628,287 B2
(45) Date of Patent: Apr. 18, 2017

(54) METHOD AND SYSTEM FOR STORING SESSION INFORMATION IN UNIVERSAL PLUG AND PLAY TELEPHONY SERVICE

(75) Inventors: Mayuresh Madhukar Patil, Bangalore (IN); Venkateswar Jeedigunta, Bangalore (IN); Joo-Yeol Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 927 days.

(21) Appl. No.: 13/048,395

(22) Filed: Mar. 15, 2011

(65) Prior Publication Data

US 2011/0222529 A1  Sep. 15, 2011

(30) Foreign Application Priority Data

Sep. 30, 2010  (IN) .............................. 684/CHE/2010

(51) Int. Cl.
| | |
|---|---|
| *H04L 12/66* | (2006.01) |
| *H04L 12/28* | (2006.01) |
| *H04L 29/06* | (2006.01) |
| *H04L 29/08* | (2006.01) |

(52) U.S. Cl.
CPC ...... *H04L 12/2838* (2013.01); *H04L 65/1063* (2013.01); *H04L 65/1069* (2013.01); *H04L 65/1083* (2013.01); *H04L 67/141* (2013.01)

(58) Field of Classification Search
CPC ............. H04L 12/2838; H04L 65/1063; H04L 65/1069; H04L 65/1083; H04L 67/141
USPC .......................................................... 370/352
See application file for complete search history.

(56) References Cited

U.S. PATENT DOCUMENTS

| | | | |
|---|---|---|---|
| 8,782,717 B2 | 7/2014 | Choi et al. | |
| 2005/0215273 A1 | 9/2005 | Ito | |
| 2005/0232247 A1 | 10/2005 | Whitley et al. | |
| 2005/0246622 A1 | 11/2005 | Ahn et al. | |
| 2007/0189733 A1* | 8/2007 | Choi et al. | 386/112 |
| 2009/0100147 A1 | 4/2009 | Igarashi | |
| 2009/0248788 A1* | 10/2009 | Hinds et al. | 709/202 |

(Continued)

FOREIGN PATENT DOCUMENTS

| | | |
|---|---|---|
| CN | 1630260 | 6/2005 |
| CN | 1996303 | 7/2007 |

(Continued)

OTHER PUBLICATIONS

Japanese Office Action dated Oct. 19, 2015 issued in counterpart application No. 2014-257220, 5 pages.

(Continued)

*Primary Examiner* — Khaled Kassim
*Assistant Examiner* — Zhaohui Yang
(74) *Attorney, Agent, or Firm* — The Farrell Law Firm, P.C.

(57) ABSTRACT

A method, system and apparatus are provided for storing session information in a home network of an UPnP telephony service. The method is performed at a Telephony Server (TS). The method receives a request from a Telephony Control Point (TCP) to store session information while the session is in progress. The session information includes a session status and session related media. The method then divides the session information into meta information and session control information. Thereafter, the method stores the session information in a memory of the TS.

18 Claims, 4 Drawing Sheets

(56) References Cited

U.S. PATENT DOCUMENTS

| | | | |
|---|---|---|---|
| 2009/0279455 A1* | 11/2009 | Wang | H04L 12/589 370/260 |
| 2010/0011069 A1* | 1/2010 | Haruna | H04L 51/36 709/206 |
| 2010/0040211 A1 | 2/2010 | Maeng et al. | |
| 2011/0082939 A1* | 4/2011 | Montemurro et al. | 709/227 |

FOREIGN PATENT DOCUMENTS

| | | |
|---|---|---|
| CN | 101013985 | 8/2007 |
| EP | 1 545 064 | 6/2005 |
| EP | 1 814 261 | 8/2007 |
| JP | 2002-183064 | 6/2002 |
| JP | 2005-234666 | 9/2005 |
| JP | 2007-041992 | 2/2007 |
| JP | 2007-208971 | 8/2007 |
| JP | 2007-274483 | 10/2007 |
| JP | 2012-500435 | 1/2012 |
| KR | 1020070078909 | 8/2007 |
| WO | WO 2010/021502 | 2/2010 |

OTHER PUBLICATIONS

Korean Office Action dated Jan. 6, 2017 issued in counterpart application No. 10-2011-0023082, 7 pages.

* cited by examiner

METHOD AND SYSTEM FOR STORING SESSION INFORMATION IN UNIVERSAL PLUG AND PLAY TELEPHONY SERVICE

PRIORITY

This application claims priority under 35 U.S.C. §119(a) to an application filed in the Indian Patent Office on Mar. 15, 2010 and assigned Serial No. 684/CHE/2010, and an application filed in the Indian Patent Office on Sep. 30, 2010 and assigned Serial No. 684/CHE/2010, the contents of which are incorporated herein by reference.

BACKGROUND OF THE INVENTION

1. Field of the Invention

The present invention relates generally to the field of home networking, and more particularly, to Universal Plug and Play (UPnP) enabled telephony devices.

2. Description of the Related Art

UPnP telephony service allows a user access to telephony services using home devices. This access provides the user with the flexibility to access telephony services at home using different kinds of devices. The UPnP is a set of computer network protocols promulgated by the UPnP forum. The goals of UPnP telephony are to allow home devices to connect seamlessly and to simplify implementation of networks in the home and corporate environments through, for example, data sharing, communications, and entertainment. The UPnP achieves these goals by defining and publishing UPnP device control protocols built upon open, Internet-based communication standards.

The UPnP architecture allows peer-to-peer networking of Personal Computers (PCs), networked appliances, and wireless devices. The UPnP architecture is a distributed, open architecture based on established standards such as Transmission Control Protocol or Internet Protocol (TCP/IP), User Datagram Protocol (UDP), Hypertext Transfer Protocol (HTTP) and Extensible Markup Language (XML).

The UPnP architecture supports zero-configuration networking. An UPnP compatible device from any vendor can dynamically join a network, obtain an IP address, announce its name, convey its capabilities upon request, and learn about the presence and capabilities of other devices. Dynamic Host Configuration Protocol (DHCP) and Domain Name System (DNS) servers are optional and are only used if they are available on the network. The UPnP compatible device can leave the network automatically without leaving any unwanted state information.

The UPnP telephony services also provide discovery, control and event mechanisms. The discovery mechanism is enabled using Simple Service Discovery Protocol (SSDP) protocol. All of the control messages will be in the form of XML and will follow General Event Notification Architecture (GENA) protocol. Thus, the UPnP dynamically determines the availability and unavailability of the devices "on the fly" to the other devices in the network.

The UPnP defines a new telephony services for expanding the user experience in the home to access telephony services including, for example, a messaging service, a presence services, and call handling (one of packet switching or circuit switching call).

The UPnP telephony defines the messaging services and call management service, which allows the user to access the messaging service by, for example, sending the message using devices that do not have the messaging capability and initiating the media calls. The UPnP telephony messaging service uses the basic UPnP architecture to define the messaging services and defines the actions and state variable to access the messaging services.

Analogous to UPnP Device Architecture (DA), the UPnP telephony services define the following three kinds of devices:

A (TS) Telephony Server that provides messaging, and presence related services to user. The TS also provides a call management service.

A Telephony Control Point (TCP) that is the same as a Control Point (CP). The TCP initiates the actions provided by the TS.

A Telephony Client (TC) device for media related handling, and for acting as the input and output of the device.

Current messaging services allow users to send messages, for example, messages using Short Message Service (SMS), Multimedia Message Service (MMS), Chat Instant Messaging (Chat IM) and Electronic mail (Email). The messaging services also allow the users to group the messages into one session. The message service defines the actions to create an IM session and also allows a user to modify the existing session. However, there exist no mechanism in UPnP technology for storing information for the completed session or to access the stored session history. There is also no mechanism to retrieve the messages from the session history in UPnP telephony services.

SUMMARY OF THE INVENTION

The present invention has been made to address at least the above problems and/or disadvantages and to provide at least the advantages described below. Accordingly, an aspect of the present invention provides a system and method for managing storage of session information in the UPnP telephony services.

According to an aspect of the present invention, a method is provided for storing session information in a home network of an UPnP telephony service. A request is received from a TCP to store session information while the session is in progress. The session information includes a session status and session related media. The session information is divided into meta information and session control information. The session information is stored in a memory of the TS.

According to another aspect of the present invention, a system is provided for storing session information in a home network of a UPnP telephony service. The system includes a TCP and a TS. The TS includes a transceiver for receiving a request from the TCP to store session information while a session is in progress, wherein the session information comprises a session status and session related media, a processor for dividing the session information into meta information and session control information, and a memory for storing the session information.

According to another aspect of the present invention, a TS is provided. The TS includes a transceiver, a processor, and a memory. The transceiver receives a request from a TCP to store session information while the session is in progress. The session information includes session status and session related media. The processor divides the session information into meta information and session control information. The memory stores the session information.

BRIEF DESCRIPTION OF THE DRAWINGS

The above and other aspects, features, and advantages of the present invention will be more apparent from the following description when taken in conjunction with the accompanying drawings, in which.

DETAILED DESCRIPTION OF EMBODIMENTS OF THE PRESENT INVENTION

Figure 1:
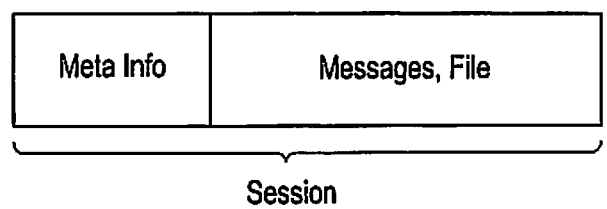
FIG. 1 is a diagram illustrating a session structure used in UPnP telephony services, in accordance with an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The terms and words used in the following description and claims are not limited to their dictionary meanings, but, are merely used by the inventor to enable a clear and consistent understanding of the invention. Accordingly, it should be apparent to those skilled in the art that the following description of embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Those skilled in the art will understand that the principles of the present disclosure may be implemented in any suitably arranged communications system. Terms first, second, and the like are used to differentiate between objects having the same terminology and are in no way intended to represent a chronological order, unless where explicitly stated otherwise. A set is defined as a non-empty set including at least one element.

FIG. 1 is a diagram illustrating a session structure used in the UPnP telephony services, in accordance with an embodiment of the present invention.

Referring to FIG. 1, the structure of a message consists of two parts. A first part is a meta data information and a second part is messages and/or file transfer in the session. Hence, the session structure includes meta information and a message. The meta information includes static information. The static information includes participant information, session identity, session number and the like. The meta information can also include dynamic information. The dynamic information includes session leaving information and session joining information.

The second part, for example, the message, includes actual messages that are being exchanged during the session. The messages can also include file transfers. The session information is stored in a new folder called "ClosedSessions" in a directory section in a TS. Thus, the TCP can access the session storage in the telephony server.

Hence, if the TS has stored a session history in the storage space, then the TCP should be able to access the session stored and retrieve the stored session. In an embodiment of the present invention, the TS is implemented to store a session history by default. In another embodiment of the present invention, the TS compresses the session history so that the storage space is less.

Figure 2:
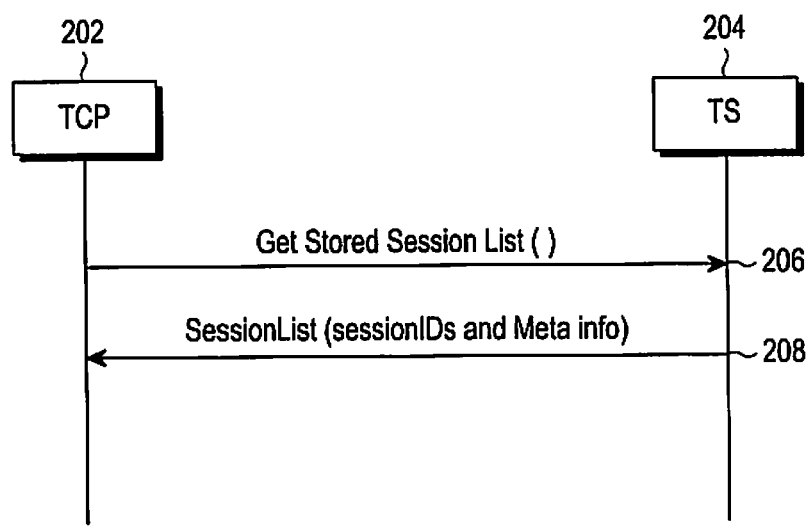
FIG. 2 is a flow diagram illustrating a method for managing storage of session information, in accordance with an embodiment of the present invention.

FIG. 2 is a flow diagram illustrating a method for managing storage of session information, in accordance with an embodiment of the present invention.

Referring to FIG. 2, a basic flow for managing storage of session information is shown. The method specifies a new action called GetStoredSessionList( ). This action has one output argument called A_ARG_TYPE_SessionsList. At step 206, a TCP 202 sends this action to get all session meta information stored in a TS 204. The TS 204 sends the session list in the output argument and this way the TCP 202 will get the session IDs of all the stored session along with meta information of the session.

The structure of the A_ARG_TYPE_SessionList is provided in Table (1) below. Table (1) provides examples for the possible meta information for a session. In an embodiment of the present invention, the meta information can be a SessionID, Participant List, Media Capabilities, Subject of the session, and the like.

In an embodiment of the present invention, the GetSession( ) action can be used to retrieve any kind of session information. The GetSession( ) with an input argument will specify the Session Status as closed or retrieve all the closed session.

For example, in the GetSession( ) action, the input argument can be as follows:

A_ARG_TYPE_SessionID: is used to retrieve the Session with particular SessionID.

A_ARG_TYPE_SessionClass: is used to retrieve the session with particular Session Class.

A_ARG_TYPE_SessionStatus: is used to retrieve the session with particular status, for example to retrieve the closed session this argument is set to closed.

In an embodiment of the present invention, the output argument is A_ARG_TYPE_SessionsList: Session Information. At step 208, the session list is received from the TS 204. The SessionList( ) argument will contain the session information. The session information can include basic session information, for example, SessionID, SessionClass, recipient information, subject of the session, and the like.

SessionList example schema is below in Table (1).

TABLE 1

Example schema

```
<?xml version="1.0" encoding="UTF-8"?>
<messaging:sessionsList
    xsi:schemaLocation="urn:schemas-upnp-org:phone:messaging
    http://www.upnp.org/schemas/phone/messaging-v1.xsd"
    xmlns:xsi="http://www.w3.org/2001/XMLSchema-instance"
    xmlns:messaging="urn:schemas-upnp-org:phone:messaging"
    xmlns:peer="urn:schemas-upnp-org:phone:peer">
    <sessionInfo>
        <sessionID>ID of the Session</sessionID>
        <sessionClass>Class of the Session</sessionClass>
        <sessionStatus>Status of the Session</sessionStatus>
        <recipientsList>
            <recipientTo>
                Recipient information
            </recipientTo>
            <recipientCc>
                Cc Recipient information
            </recipientCc>
            <recipientBcc>
                Bcc Recipient information
            </recipientBcc>
            <recipientFrom>
                Session creator information
            </recipientFrom>
        </recipientsList>
    <subject>ASDC</subject>
    </sessionInfo>
</messaging:sessionsList>
```

Figure 3:
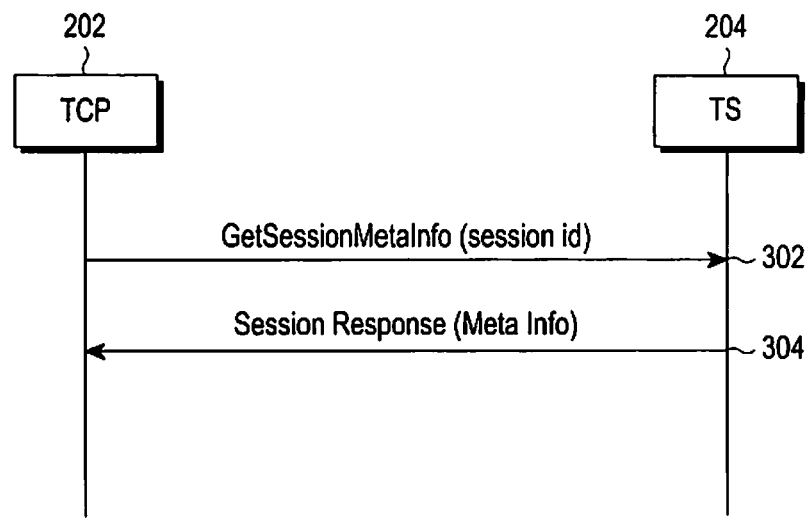
FIG. 3 is a flow diagram illustrating a method for retrieving Meta information of a particular session, in accordance with an embodiment of the present invention.

FIG. 3 is a flow diagram illustrating a method for retrieving meta information of a particular session, in accordance with an embodiment of the present invention.

Referring to FIG. 3, at step 302 the TCP 202 sends a request to the TS 204 to get the meta data information of a particular session. A new action called GetSessionMetaInfo (session ID) is used to send a request. This action has one input called A_ARG_SessonID and one output argument called A_ARG_TYPE_SessionList. The TCP 202 can directly fetch the meta information of the session from the TS 204.

In an embodiment of the present invention, a single action GetSession( ) can also be used to retrieve the meta information of a particular closed session. Hence, the session information can be retrieved by invoking the GetSession( ) action along with the SessionID of the session and SessionStatus as Closed session. At step 304, the TS 204 responds to the request by sending the meta information of the requested session.

Figure 4:
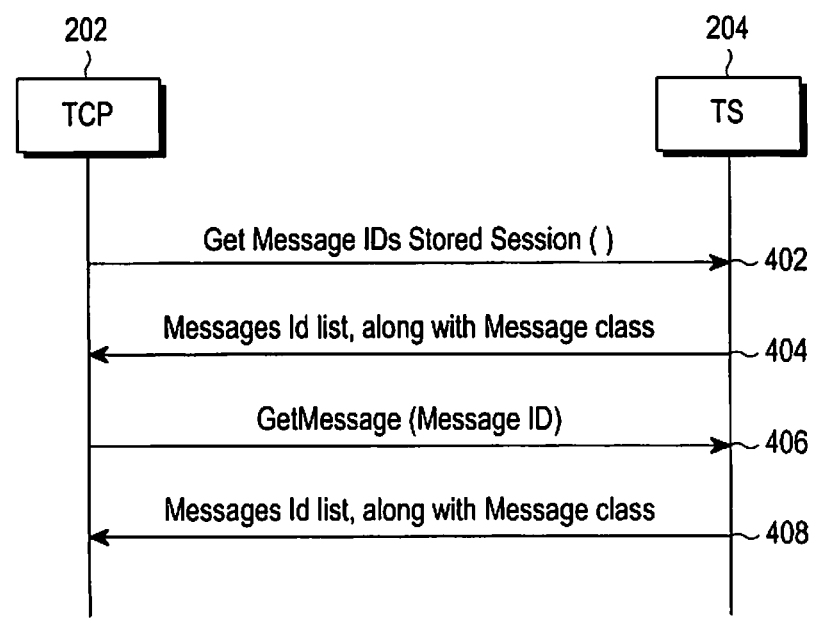
FIG. 4 is a flow diagram illustrating a method for retrieval of the messages of the stored messages, in accordance with an embodiment of the present invention.

FIG. 4 is a flow diagram illustrating a method for retrieval of the messages of the stored messages, according to an embodiment of the present invention;

Referring to FIG. 4, a method for retrieval of the messages of the stored messages is shown. In order to perform this method, a new action called GetMessageIDsStoredSession( ) is used for retrieval of all the message IDs. This action has one input argument called A_ARG_TYPE_SessiondID. The variable will be indicated in the session ID of the session whose messages are required to be fetched.

This action has one output argument called A_ARG_TYPEMessageIDlist. The argument will include all the message IDs and the messages class of the messages. At step 402, the TCP 202 will send GetMessageIDsStoredSession( ) action to the TS 204. At step 404, a message ID list along with the message class is sent by the TS 204 to the TCP 202. At step 406, the TCP 202 requests for a specific message to be retrieved by sending the message ID to the TS 204.

The TCP 202 can send GetMessage (Message ID) to the TS 204. At step 408, the TS 204 will respond with a message ID list along with the message class. All message IDs are sent to the TCP 202. Thus, the TCP 202 can retrieve a required message. The TCP 202 can use a ReadMessage( ) action or SearchMessage( ) action to retrieve a message from the session.

Figure 5:
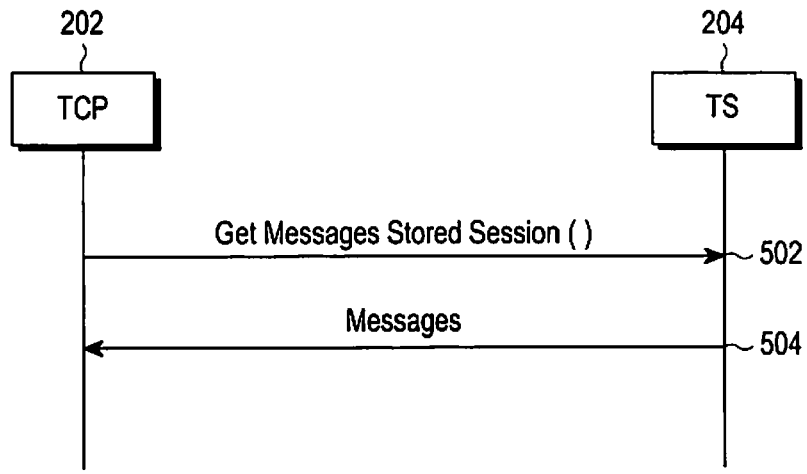
FIG. 5 is a flow diagram illustrating a method for retrieval of all messages from the TCP, in accordance with an embodiment of the present invention.

FIG. 5 is a flow diagram illustrating a method for retrieval of all messages from the TCP, in accordance with an embodiment of the present invention.

Referring to FIG. 5, the method allows the TCP 202 to retrieve all messages in one request. For the method, a new action called GetMessagesStoredSession( ) is introduced. This action has one argument called A_ARG_TYPE_SessionID. The action includes a session ID whose messages are to be retrieved. The action has one output argument called A_ARG_TYPE_MessageList, which will retrieve entire messages in the XML structure. Similarly, the TCP 202 can use an existing action, for example SearchMessage( ) action and/or ReadMessage( ) action to retrieve all the messages from the session. These actions require enabling and disabling of the session history.

Hence, the method allows enabling and disabling session history. The enabling and disabling can be done using new arguments, for example, A_ARG_TYPE_History action. This variable will be set to true when history is enabled for the session. This argument can be included in an action, such as, CreateSession( ), ModifySession( ) and AcceptSession( ). At step 502, the TCP 202 requests the TS 204 to get the messages using action GetMessageStoredSession( ). At step 504, the TS 204 sends the messages to the TCP 202 after receiving the request.

Figure 6:
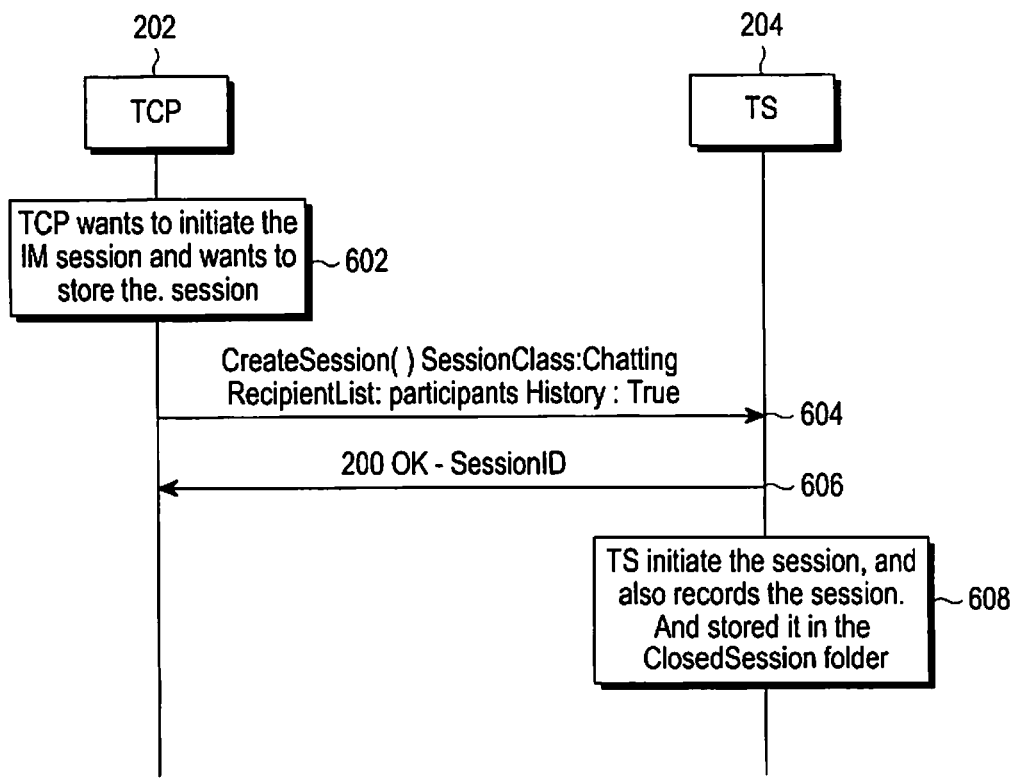
FIG. 6 is a flow diagram illustrating a method for enabling session storage while creating a new session, in accordance with an embodiment of the present invention.

FIG. 6 is a flow diagram illustrating a method for enabling session storage while creating a new session, in accordance with an embodiment of the present invention.

Referring to FIG. 6, the flow diagram depicts a method for enabling the session storage while creating a session. At step 602, the TCP 202 decides to initiate an IM session, and thereafter store the session in the TS 204. At step 604, the TCP 202 sends a CreateSession( ) action to create a session. This action includes a new argument called A_ARG_TYPE_History.

Further, the state variable value will be set to true. This will indicate to the TS 204 that the session storage is required for a particular session. For example, at step 604, the TCP 202 sends SessionClass: Chatting, RecipientList: participants, and History: True. At step 606, the TS 204 sends a 200 OK message in response to the request. At step 608, the TS 204 initiates the session and stores the session in the ClosedSession folder available at the TS 204.

Figure 7:
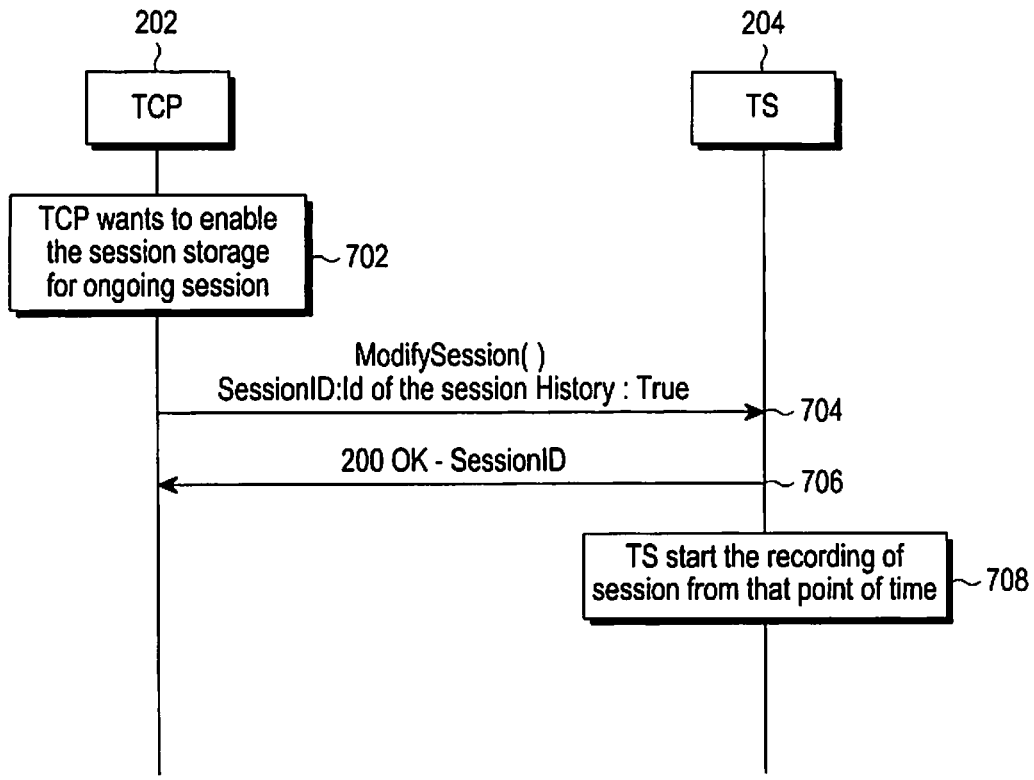
FIG. 7 is a flow diagram illustrating a method for enabling session storage for an ongoing session, in accordance with an embodiment of the present invention.

FIG. 7 is a flow diagram illustrating a method for enabling and modifying session storage for an ongoing session, in accordance with an embodiment of the present invention.

Referring to FIG. 7, a flow diagram for modifying a stored session while a session is ongoing. At step 702, the TCP 202 decides to sends a request to enable the session storage for an ongoing session. At step 704, the TCP 202 sends a ModifySession( ) action to modify a session along with an ID of the session and history arguments.

The action includes a new argument called A_ARG_TYPE_History. This state variable will be set to a value of true, which will indicate that session storage is required for the particular session. At step 706, the TS 204 sends a 200 OK message in response to the request. At step 708, the TS 204 initiates the session and stores the session in the ClosedSession folder. In an embodiment of the present invention, for an incoming session, the TCP 202 can request to record the session by including the same argument in the action.

Embodiments of the present invention provide methods and a system for storing session information in a home network of an UPnP telephony service. The method allows a user to fetch a past message. Using this method, the messages are stored in the TS and the user can access them later if the user was not available online or if the user joins an ongoing session. Hence, the user can have access to the old messages that was missed when the user joins a session in between the ongoing session. The method allows the user to know the status of the session at all times.

For example, when the user is transferring a file to a WAN network, it is possible for that session to be terminated if any internal error occurs during the session. Hence, such errors are captured using this method. Thus, the method captures the status of the session in such scenarios. Using the above method, the user need not reply on the WAN side session storage mechanism, and as such, services in WAN side are chargeable services. This method can provide the user with the ability to store the session status locally without accessing the WAN technologies.

Further, since the WAN side session storage will not be able to capture home devices' related status, for example, an error in particular devices like a Media server because the WAN is not aware of different devices outside. The methods of the present invention are useful as they captures the status even when the error has occurred in the home network device. The methods also provide the user with flexibility for accessing the status of the session with any device at later point of time. Hence, the user can use his other TCP device to retrieve the session information without accessing the WAN side.

Figure 8:
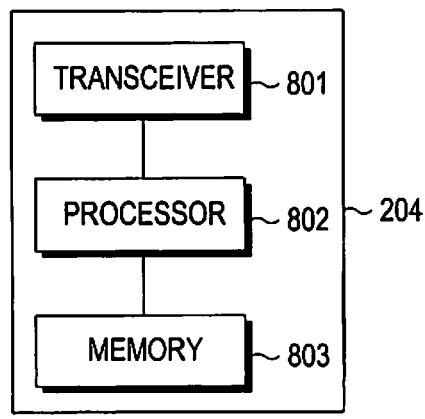
FIG. 8 is a diagram illustrating a structure of the telephony server, in accordance with an embodiment of the present invention.

FIG. 8 is a diagram illustrating a structure of the telephony server, in accordance with an embodiment of the present invention.

Referring to FIG. 8, a telephony server 204 includes a transceiver 801, a processor 802, and a memory 803. The transceiver 801 receives a request from a TCP 202 to store session information while the session is in progress. The session information includes session status and session related media. The processor 802 divides the session information into meta information and session control information. The memory stores the session information.

The session control information includes at least one of participant information, a session identity and a session number.

The processor 802 retrieves the session information when a request to retrieve the session information is received from the TCP 202, retrieves first meta information from the stored session information, receives a session identifier from the TCP 202 and retrieves the session information associated with the received session identifier.

Further, the processor 802 receives a message identifier from the TCP 202 and retrieves the session information associated with the received message identifier.

The processor 802 retrieves a plurality of messages when a request for retrieves the plurality of messages is received from the TCP 202.

The processor 802 dynamically handles session storage while the session is running Dynamically handling the session storage includes at least one of handling the session storage when the session is set up, handling the session storage when the session is in progress, and handling the session storage.

Embodiments of the present invention are related to the use of a computer system for implementing the techniques described herein. In one embodiment, the techniques are performed by a processor by using information included in a memory. Such information can be read into the main memory from a machine-readable medium, such as a storage device. The information included in the memory causes the processor to perform the methods described herein.

The term "machine-readable medium" as used herein refers to any medium that participates in providing data that causes a machine to operate in a specific fashion. In an embodiment of the present invention, which is implemented using the computer system, various machine-readable mediums are involved, for example, in providing information to the processor for execution. The machine-readable medium can be a storage media. Storage media includes both non-volatile media and volatile media. Non-volatile media includes, for example, optical or magnetic disks, such as a server storage unit. Volatile media includes a dynamic memory. All such media must be tangible to enable the information carried by the media to be detected by a physical mechanism that reads the information into a machine.

Common forms of machine-readable medium include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, and any other memory chip or cartridge.

In an embodiment of the present invention, the machine-readable medium can be a transmission media including coaxial cables, copper wire and fiber optics, including the wires that include a bus. Transmission media can also take the form of acoustic or light waves, such as those generated during radio-wave and infra-red data communications. Examples of machine-readable media may include, but are not limited to, any medium from which a computer can read, for example online software, download links, installation links, and online links.

While the invention has been shown and described with reference to certain embodiments thereof, it will be understood by those skilled in the art that various changes in form and detail may be made therein without departing from the spirit and scope of the invention as defined by the appended claims and their equivalents.

What is claimed is:

1. A method for storing session information by a server in a home network of a Universal Plug and Play (UPnP) telephony service, the method comprising:
   receiving, from a control point, a request for storing session information for each of one or more sessions related to a messaging service, wherein the session information includes meta information of a corresponding session and one or more messages of the corresponding session;
   storing the session information in a memory of the server; and
   if a request for transmitting a session list including the meta information is received from the control point, transmitting, to the control point, the meta information and a session identifier for each of the one or more sessions.

2. The method of claim 1, wherein the meta information comprises participant information of the corresponding session, a session identifier of the corresponding session, a session number of the corresponding session, media capabilities of the corresponding session, or a subject of the corresponding session.

3. The method of claim 1, further comprising:
if a request for transmitting meta information is received from the control point, searching and transmitting the requested meta information from the memory to the control point.

4. The method of claim 3, wherein the request for transmitting the meta information includes
a session identifier of the requested session information.

5. The method of claim 1, further comprising:
receiving a request for transmitting a message identifier list including message identifiers for each of the one or more messages from the control point; and
transmitting the message identifier list and a message type for each of the one more messages to the control point.

6. The method of claim 5, further comprising:
if a message identifier is received from the control point, searching and transmitting a message corresponding to the message identifier from the memory of the server.

7. The method of claim 1, further comprising:
if one or more session identifiers are received from the control point, transmitting messages corresponding to each of the one or more session identifiers to the control point.

8. The method of claim 1, further comprising:
if a request for creating a session is received from the control point, initiating and storing the requested session,
wherein the request for creating the session includes a session type of the requested session and a recipient list for one or more recipients of the requested session.

9. The method of claim 1, further comprising:
if a request for modifying a session is received from the control point, initiating and storing the requested session.

10. A server of a Universal Plug and Play (UPnP) telephony service, comprising:
a memory;
a transceiver; and
a processor configured to:
control the transceiver to receive a request, from a control point, for storing session information for each of one or more sessions related to a messaging service, wherein the session information includes meta information of a corresponding session and one or more messages of the corresponding session,
store the session information to the memory, and
if a request for transmitting a session list including the meta information is received from the control point, control the transceiver to transmit, to the control point, the meta information and a session identifier for each of the one or more sessions.

11. The server of claim 10, wherein the meta information includes participant information of the corresponding session, a session identifier of the corresponding session, a session number of the corresponding session, media capabilities of the corresponding session, or a subject of the corresponding session.

12. The server of claim 10, wherein the processor is further configured to:
if a request for transmitting meta information is received from the control point, search for and transmit the requested meta information to the control point through the transceiver.

13. The server of claim 12, wherein the request for transmitting the meta information includes a session identifier of the requested session information.

14. The server of claim 10, wherein the processor is further configured to:
if a request for transmitting a message identifier list including message identifiers for each of the one or more messages from the control point, control the transceiver to transmit the message identifier list and a message type for each of the one or more messages to the control point.

15. The server of claim 14, wherein the processor is further configured to:
if a message identifier is received from the control point, search for and transmit a message corresponding to the message identifier from the memory to the control point.

16. The server of claim 10, wherein the processor is further configured to control the transceiver to transmit a plurality of messages if a request for transmitting the plurality of messages is received from the control point.

17. The server of claim 10, wherein the processor is further configured to:
if a request for creating a session is received from the control point, initiate and store the requested session in the memory,
wherein the request for creating the session includes a session type of the requested session and a recipient list for one or more recipients of the requested session.

18. The server of claim 10, wherein the processor is further configured to:
if a request for modifying a session is received from the control point, initiate and store the requested session in the memory.

* * * * *